United States Patent
Nommensen

(10) Patent No.: US 11,480,287 B2
(45) Date of Patent: Oct. 25, 2022

(54) THREAD PROTECTOR

(71) Applicant: COBALT EXTREME PTY LTD, East Brisbane (AU)

(72) Inventor: David Nommensen, Norman Park (AU)

(73) Assignee: COBALT EXTREME PTY LTD, East Brisbane (AU)

(*) Notice: Subject to any disclaimer, the term of this patent is extended or adjusted under 35 U.S.C. 154(b) by 0 days.

(21) Appl. No.: 17/308,615

(22) Filed: May 5, 2021

(65) Prior Publication Data

US 2021/0348709 A1   Nov. 11, 2021

(30) Foreign Application Priority Data

May 6, 2020   (AU) ................................ 2020901442

(51) Int. Cl.
 *F16L 57/00* (2006.01)
 *E21B 17/00* (2006.01)
 *B65D 59/06* (2006.01)

(52) U.S. Cl.
 CPC ............ *F16L 57/005* (2013.01); *B65D 59/06* (2013.01); *E21B 17/006* (2013.01)

(58) Field of Classification Search
 CPC ... E21B 17/1071; E21B 17/006; B65D 59/00; B65D 59/06
 USPC ................................................ 138/96 T, 96 R
 See application file for complete search history.

(56) References Cited

U.S. PATENT DOCUMENTS

| | | | | |
|---|---|---|---|---|
| 1,489,785 A * | 4/1924 | Porter | ..................... | F16B 37/04 |
| | | | | 138/96 T |
| 2,082,144 A | 6/1937 | Bowers | | |
| 2,195,530 A * | 4/1940 | Curtis | ................... | F16L 57/005 |
| | | | | 138/96 T |
| 2,231,794 A * | 2/1941 | Bradley | ................ | B65D 59/06 |
| | | | | 138/96 T |
| 2,873,765 A | 2/1959 | Gregory | | |
| 2,930,409 A | 3/1960 | Higgins | | |
| 4,033,380 A * | 7/1977 | Weber | .................... | B65D 59/06 |
| | | | | 138/96 T |
| 4,134,513 A * | 1/1979 | Mumford | ........... | B65D 41/0428 |
| | | | | 215/214 |
| 5,788,099 A * | 8/1998 | Treu | .................... | A61M 1/3646 |
| | | | | 222/81 |
| 5,908,048 A * | 6/1999 | Van Driel | ............. | A61M 39/20 |
| | | | | 220/796 |
| 6,854,613 B2 * | 2/2005 | Biesecker | ............ | B65D 50/046 |
| | | | | 215/218 |

(Continued)

*Primary Examiner* — Patrick F Brinson
(74) *Attorney, Agent, or Firm* — Greer, Burns & Crain, Ltd

(57) ABSTRACT

A thread protector for use with sucker rods and other downhole tools is pushable onto an end of the sucker rod for secure retention. The thread protector is optionally squeezed and rotated for release from the end of the sucker rod. Included on the protector is a sleeve having a closed end and an opposite open end for receiving and pushably engaging with the end of the sucker rod. The sleeve has one or more first regions around a circumference of the sleeve having reduced diameter for engagement with one or more regions of the end of the sucker rod and one or more second regions around the circumference of the sleeve having enlarged diameter. Application of pressure to the one or more second regions of the sleeve causes disengagement of the one or more first regions from the end of the sucker rod for removal of the thread protector.

25 Claims, 10 Drawing Sheets

(56) References Cited

U.S. PATENT DOCUMENTS

| | | | |
|---|---|---|---|
| 8,210,376 B2 * | 7/2012 | Robinson | B65D 50/046 |
| | | | 215/217 |
| 9,975,673 B2 | 5/2018 | Prater et al. | |
| 2019/0003263 A1 | 1/2019 | Halim et al. | |

* cited by examiner

THREAD PROTECTOR

BACKGROUND

The present invention is directed to thread protectors, in particular, thread protectors for use with sucker rods, drill pipes, connectors and other downhole tools, particularly downhole oil tools, having a thread that requires protection.

Sucker rods, drill pipes, connectors and other downhole tools, particularly downhole oil tools used in oil well pumping typically have an internal or external thread at one or both ends to enable multiple sucker rods and the like to be joined together to reach the typically large depths involved. Part of a typical sucker rod 1 comprising an external thread is shown in FIG. 1. The sucker rod 1 comprises a pin 2, an upset bead 3, a wrench square 4 and a pin shoulder 5 having a flange or face 6. The pin 2 of the sucker rod comprises an unthreaded portion 7, often referred to as the stress relief, and an externally threaded portion 8.

Sucker rods and the like typically encounter harsh and even extreme conditions during use and storage, during insertion and removal from wells and during transportation. Therefore, there is a need to protect the internal and external threads from such harsh conditions during storage and transportation to maximize the useful life of sucker rods and the like and to reduce the likelihood of failure during use, which can be very costly in terms of downtime and replacement.

One common solution is to place a cap or the like, in the form of a thread protector, over the end or ends of the sucker rods comprising the internal or external thread and many different designs of thread protector or cap have emerged over the years.

U.S. Pat. No. 2,082,144 teaches a metal thread protector in the form of a cap having a closed end and an opposite, open end such that the cap can be placed over the external thread of the sucker rod. Some embodiments have a shoulder for fitting over a shoulder of the sucker rod. A plurality of clamping lugs extends from the shoulder which must be bent under a flange of the sucker rod to keep the cap in place. The clamping lugs must also be unbent to remove the cap. Bending and unbending of the clamping lugs is time consuming and after some use the clamping lugs can be prone to snapping off rendering the cap insecure and of limited or no use. Other similar embodiments are disclosed in U.S. Pat. No. 2,082,144 for protecting an internal thread at the end of sucker rods and the like. The patentee for U.S. Pat. No. 2,082,144 acknowledges that such embodiments do not protect the internal and external threads from moisture and dirt, thus requiring the internal and external threads to be cleaned before use or the sucker rod to be discarded altogether. Therefore, U.S. Pat. No. 2,082,144 teaches alternative embodiments comprising a washer of felt, foil or other material to be inserted between, for example, the shoulder of the sucker rod and the shoulder of the cap. Whilst assisting in the prevention of moisture and dirt ingress, it is more time consuming to fit the washer before fitting the cap and to remove the washer as well as the cap before use of the sucker rod. The washer can also easily be lost or misplaced. Being made of metal such caps also have a large material cost and mass.

U.S. Pat. No. 2,873,765 teaches an improved sucker rod thread protector made of a flexible, elastic plastic, such as polyethylene, which addresses, at least to an extent, the aforementioned problems of mass and cost of production. One embodiment of the thread protector in U.S. Pat. No. 2,873,765 is of a tapered construction having a closed end and an internally projecting annular locking bead at the opposite open end for securing the thread protector over the flange of the sucker rod. Such embodiments are simply pushed on the end of the sucker rod and pulled off. However, such thread protectors can come loose, for example, due to vibration etc. during shipping. Other embodiments disclosed in U.S. Pat. No. 2,873,765 comprise multiple conical sections of different diameters such that the thread protector can be secured to sucker rods of different diameter. Internal locking beads are provided for engagement with the external thread of the sucker rod. Such embodiments require unscrewing to be removed and can be time consuming to remove depending on the number of internal locking beads engaging the external thread. The thread protectors of U.S. Pat. No. 2,873,765 are intended as single use only and so can be costly and are not environmentally considerate.

U.S. Pat. No. 2,930,409 teaches another thread protector comprising a plurality of internal protectors, some of which engage with the external thread of the sucker rod. Such thread protectors are installed on the end of sucker rods with a torque wrench to provide a tight fit with the external thread. Hence, such thread protectors require a specialist tool to install and remove and can be difficult to remove by hand. There is also no prescribed torque by which to install such thread protectors, which could result in damage to the external thread of the sucker rod and/or to the thread protector. If a torque wrench is not available and the thread protector is installed by hand, the thread protector is prone to falling off.

Other thread protectors are known which suffer from one or more of the aforementioned drawbacks. Yet further thread protectors are known, which have a complex construction, and/or have multiple components and/or are not sufficiently robust for such harsh environments. For example, some thread protectors are made of nylon and are prone to cracking rendering them useless.

The reference to any prior art in this specification is not, and should not be taken as, an acknowledgement or any form of suggestion that the prior art forms part of the common general knowledge.

A preferred object of the present invention is to provide a thread protector for use with sucker rods, drill pipes and other downhole tools, particularly downhole oil tools, that addresses, or at least ameliorates one or more of the aforementioned problems and/or provides a useful commercial alternative.

SUMMARY

Generally, the present invention is directed to a thread protector, in particular, a thread protector for use with sucker rods, drill pipes and other downhole tools, particularly downhole oil tools.

Generally, the thread protector can simply be pushed onto an end of the sucker rod or tool and the thread protector remains securely in place to protect an external thread of the end of the sucker rod or tool.

Generally, in some embodiments, the thread protector must be squeezed to release the thread protector from the end of the sucker rod or tool, which allows the thread protector to be pulled off the end of the sucker rod or tool.

Generally, in other embodiments, the thread protector must be both squeezed and rotated to release the thread protector from the end of the sucker rod or tool to allow the thread protector to be pulled off the end of the sucker rod or tool.

According to one aspect, but not necessarily the broadest aspect, the present invention resides in a thread protector for use on a sucker rod or tool, the sucker rod or tool comprising an end having at least one externally threaded portion, a flange and an unthreaded portion between the at least one externally threaded portion and the flange, the thread protector comprising:

a sleeve having a closed end and an open end opposite the closed end, the open end for receiving the end of the sucker rod or tool;

the sleeve having at least two first regions separated around a circumference of the sleeve, the at least two first regions of reduced diameter for engagement with regions of the unthreaded portion of the sucker rod or tool;

the sleeve having at least two second regions separated around a circumference of the sleeve, the at least two second regions of enlarged diameter;

whereupon application of pressure to the at least two second regions of the sleeve causes disengagement of the at least two first regions from regions of the unthreaded portion of the sucker rod or tool to enable removal of the thread protector from the end of the sucker rod or tool.

Suitably, the sleeve comprises at least one protrusion extending from an internal wall of the sleeve around at least part of the circumference of the sleeve, the at least one protrusion for engagement with at last one thread of the at least one externally threaded portion of the end of the sucker rod or tool. In this embodiment, the thread protector must also be rotated to enable removal of the thread protector from the end of the sucker rod or tool.

Preferably, the at least two first regions of reduced diameter of the sleeve are on opposite sides of the sleeve, i.e. diametrically opposite each other.

Preferably, the at least two second regions of enlarged diameter of the sleeve are on opposite sides of the sleeve, i.e. diametrically opposite each other.

Preferably, at least one of the at least two first regions of reduced diameter of the sleeve is 90 degrees apart from at least one of the at least two second regions of enlarged diameter.

Suitably, the internal wall of the sleeve is substantially elliptical in cross section, the substantially elliptical shape comprising the at least two separated first regions of reduced diameter and the at least two separated second regions of enlarged diameter Suitably, at least part of the internal wall of the sleeve around at least part of the circumference of the sleeve is adjacent at least part of the externally threaded portion of the end of the sucker rod or tool.

Suitably, at least part of the internal wall of the sleeve around at least part of the circumference of the sleeve is spaced apart from at least part of the externally threaded portion of the end of the sucker rod or tool.

Suitably, at least part of the internal wall of the sleeve around at least part of the circumference of the sleeve is spaced apart from at least part of the unthreaded portion of the end of the sucker rod or tool.

Suitably, the open end of the sleeve comprises a region of enlarged diameter about the circumference for engagement with the flange of the sucker rod or tool.

Suitably, the region of enlarged diameter of the open end of the sleeve comprises at least one protrusion extending from the internal wall of the sleeve around at least part of the circumference of the sleeve, the at least one protrusion for engagement with the flange.

Suitably, an external wall of the sleeve comprises one or more spaced apart ribs or protrusions to facilitate grip of the thread protector.

Preferably, the thread protector has a unitary structure, i.e. is a one-piece component.

Suitably, the thread protector is moulded from any suitable plastics material, in particular, injection moulded from urethane.

Suitably, the thread protector is colour-coded according to a category or classification of use, such as, but not limited to an American Petroleum Industry (API) category, or equivalents in other countries.

Suitably, the thread protector comprises an identification device, such as a RFID chip, a QR code, or a barcode, for example, mounted to, affixed to, printed on or embedded in the closed end of the sleeve.

Suitably, the identification device enables one or more of the following characteristics of the sucker rod, pipe or tool to which the thread protector is attached to be determined: a location; a wear or use status, such as new, used or refurbished.

According to another aspect, but not necessarily the broadest aspect, the present invention resides in a sucker rod or tool comprising an end having at least one externally threaded portion, a flange and an unthreaded portion between the at least one externally threaded portion and the flange, and the aforementioned thread protector engaged with the end of the sucker rod or tool.

According to another aspect, but not necessarily the broadest aspect, the present invention resides in a thread protector for use on a sucker rod or tool, the sucker rod or tool comprising an end having at least one externally threaded portion, a flange and an unthreaded portion between the at least one externally threaded portion and the flange, the thread protector comprising:

a sleeve having a closed end and an open end opposite the closed end, the open end for receiving and engaging with the end of the sucker rod or tool by pushing the thread protector onto the end of the sucker rod or tool;

the sleeve having one or more first regions around a circumference of the sleeve having reduced diameter for engagement with one or more regions of the end of the sucker rod or tool;

the sleeve having one or more second regions around the circumference of the sleeve having enlarged diameter;

whereupon application of pressure to the one or more second regions of the sleeve causes disengagement of the one or more first regions from the end of the sucker rod or tool to enable removal of the thread protector from the end of the sucker rod or tool.

Suitably, the sleeve comprises at least one protrusion, extending from an internal wall of the sleeve around at least part of the circumference of the sleeve, for engagement with at last one thread of the at least one externally threaded portion of the end of the sucker rod or tool such that the thread protector must also be rotated to enable removal of the thread protector from the end of the sucker rod or tool.

According to a further aspect, but not necessarily the broadest aspect, the present invention resides in a thread protector for use on a sucker rod or tool, such as, but not limited to a connector, the sucker rod or tool comprising an open end having at least one internally threaded portion, the thread protector comprising:

a cap to cover the open end;

a body extending from an underside of the cap, the body having an external thread for engagement with the at least one internally threaded portion; and at least one lug protruding from a top surface of the cap to facilitate insertion of the thread protector into the open end and removal of the thread protector from the open end.

Suitably, the thread protector comprises an aperture extending into the cap, and optionally into the body, to facilitate tightening and loosening of the thread protector using a standard tool.

Further features and/or aspects of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Figure 1:
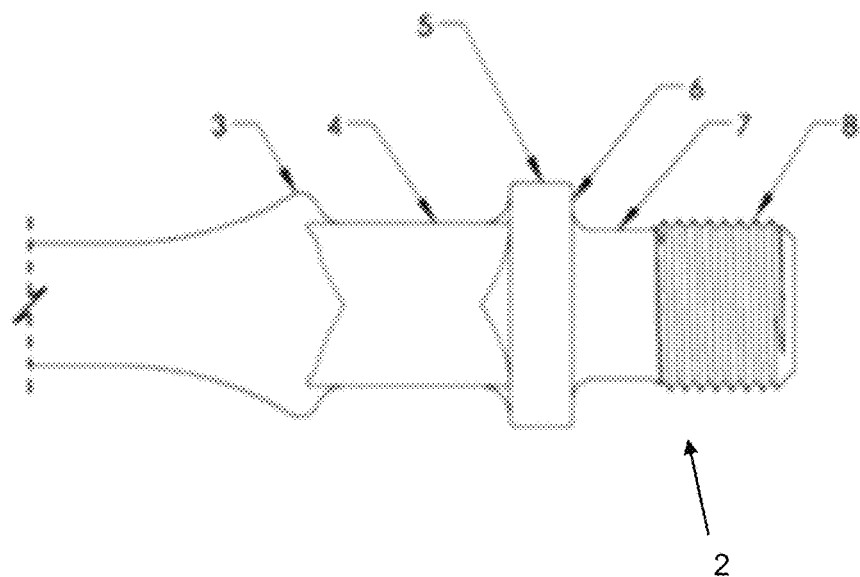
FIG. 1 is a side view of an end of a typical sucker rod comprising an external thread.

Skilled addressees will appreciate that elements in the drawings are illustrated for simplicity and clarity and have not necessarily been drawn to scale. For example, the relative dimensions of some elements in the drawings may be distorted to help improve understanding of embodiments of the present invention.

DETAILED DESCRIPTION

According to some embodiments of the thread protector of the present invention, the thread protector can simply be pushed onto an end of the sucker rod or tool comprising an external thread, or pushed into a cavity comprising an internal thread, and the thread protector remains securely in place to protect the external or internal thread of the end of the sucker rod or tool.

According to some embodiments of the thread protector of the present invention, the thread protector must be squeezed to release the thread protector from the end of the sucker rod or tool, which allows the thread protector to be pulled off the end of the sucker rod or tool.

According to other embodiments of the thread protector of the present invention, the thread protector, the thread protector must be both squeezed and rotated to release the thread protector from the end of the sucker rod or tool to allow the thread protector to be pulled off the end of the sucker rod or tool.

Figure 2:
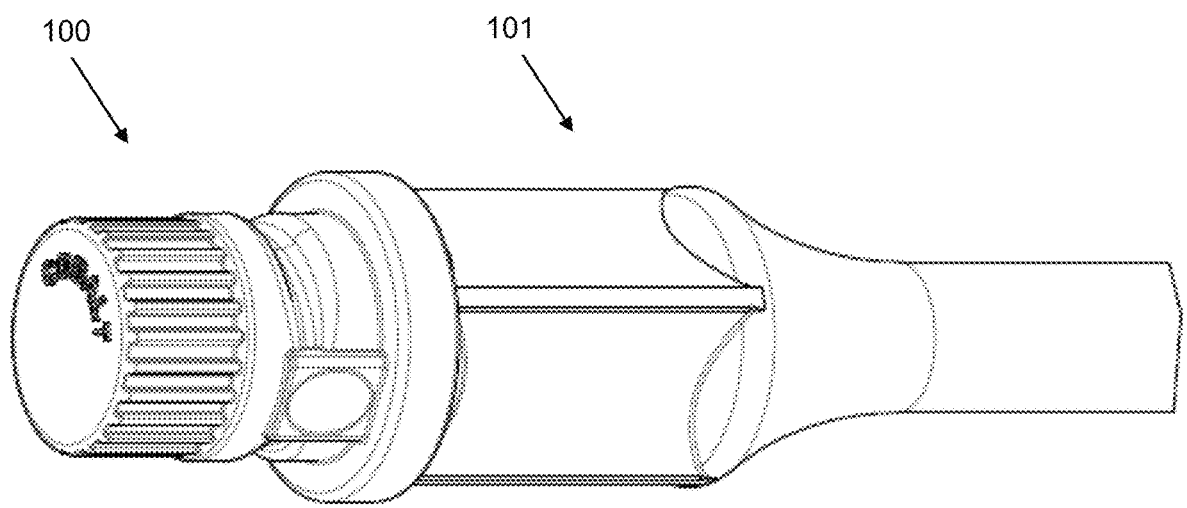
FIG. 2 is a perspective view of a thread protector in accordance with embodiments of the present invention attached to an end of a typical sucker rod comprising an external thread.
Figure 3:
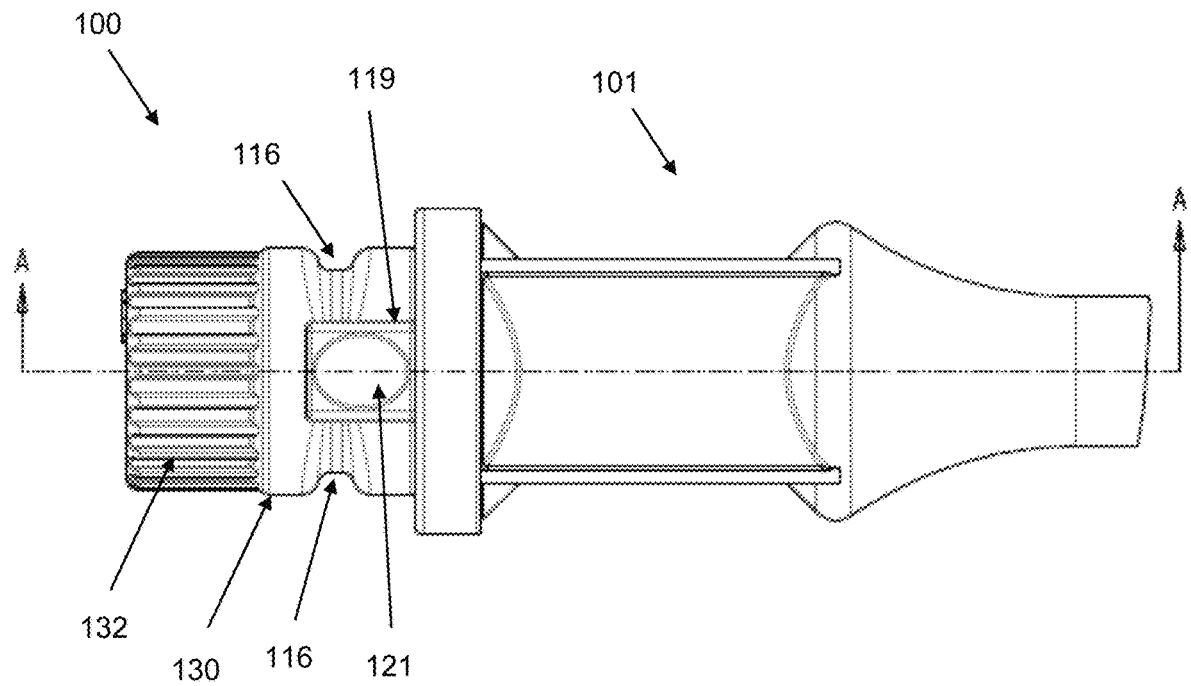
FIG. 3 is a plan view of the thread protector attached to the sucker rod shown in FIG. 2.
Figure 4:
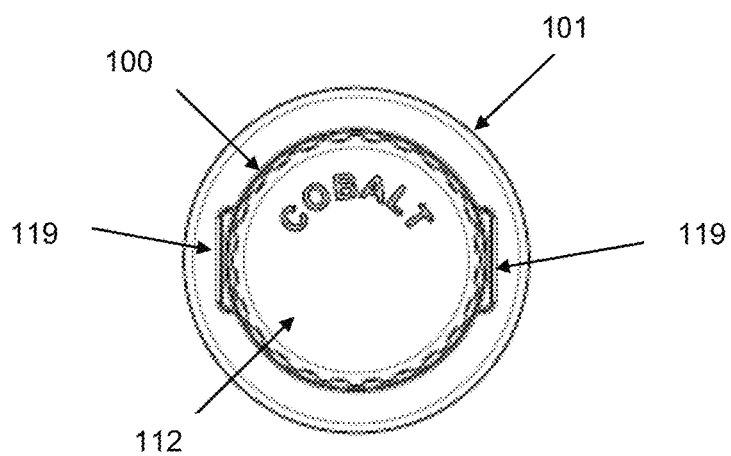
FIG. 4 is an end view of the thread protector attached to the sucker rod shown in FIG. 2.

With reference to FIGS. 2 to 4, a thread protector 100 in accordance with some embodiments of the present invention is provided for use on a sucker rod or tool 101, of the type shown in FIG. 1. The sucker rod or tool 101 comprises a pin or end 102 having at least one externally threaded portion 104, a flange 106 and an unthreaded portion 108, or stress relief between the at least one externally threaded portion 104 and the flange 106.

Figure 5:
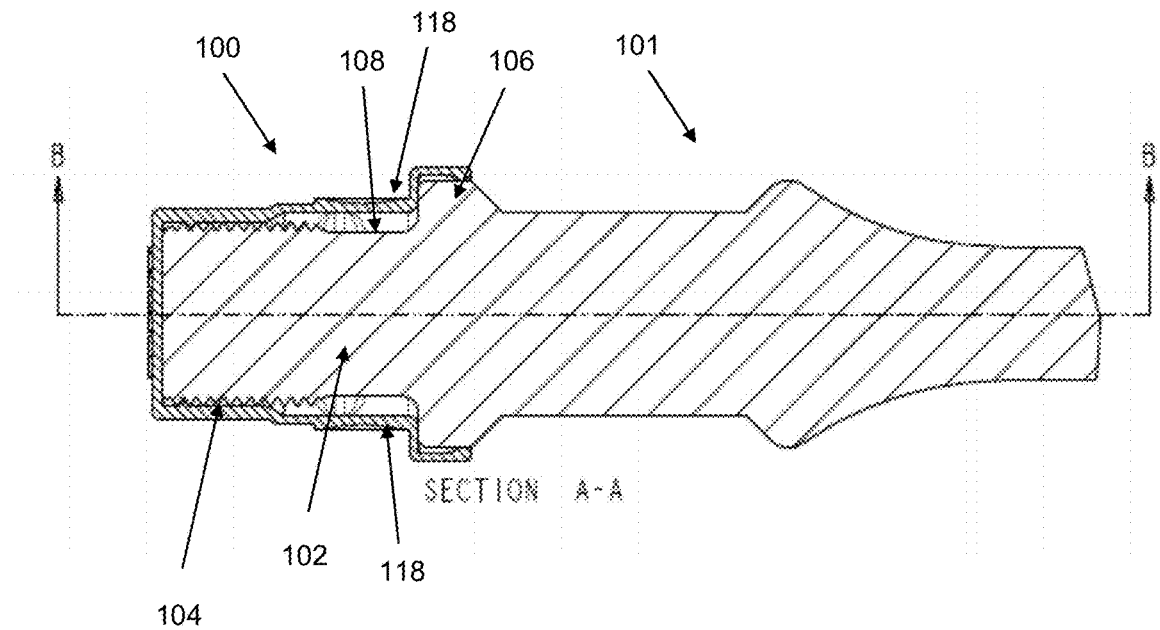
FIG. 5 is a cross-sectional view of the thread protector attached to the sucker rod shown in FIG. 2 along A-A.
Figure 6:
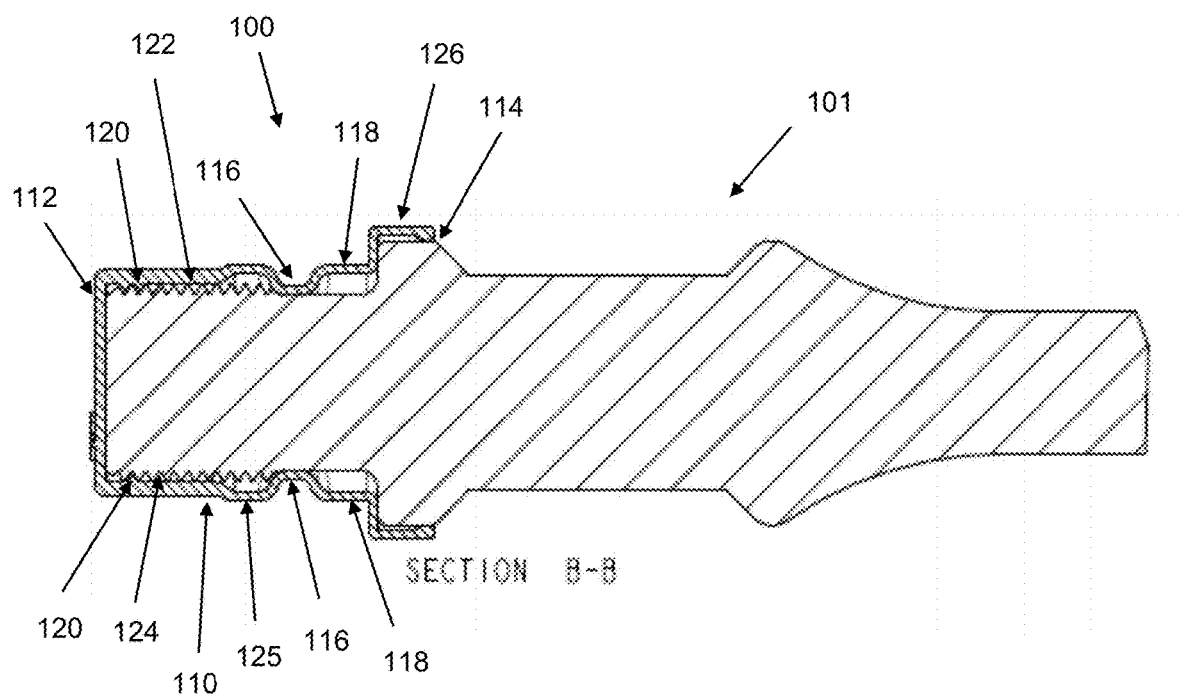
FIG. 6 is a cross-sectional view of the thread protector attached to the sucker rod shown in FIG. 3 along B-B.
Figure 7:
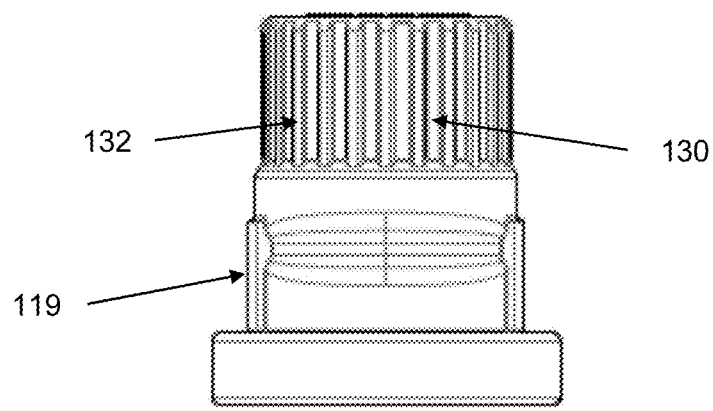
FIG. 7 is side view of the thread protector shown in FIG. 2.
Figure 8:
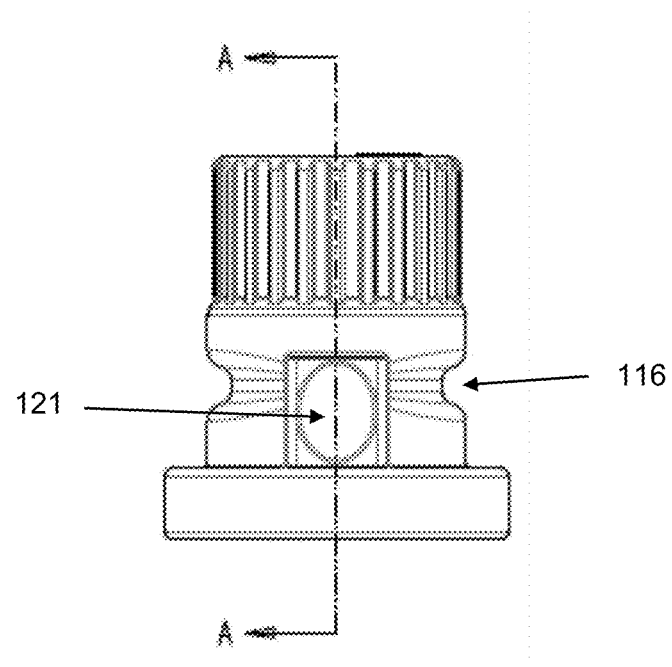
FIG. 8 is a plan view of the thread protector shown in FIG. 2.

With additional reference to FIGS. 5 and 6, the thread protector 100 comprises a sleeve 110 having a closed end 112 and an open end 114 opposite the closed end. The open end 114 is for receiving at least part of the pin or end 102 of the sucker rod or tool 101.

The sleeve 110 comprises at least two first regions 116 separated around a circumference of the sleeve 110. The at least two first regions 116 are of reduced diameter for engagement with regions of the unthreaded portion 108 of the sucker rod or tool 101, as shown in FIG. 6. With reference to the plan view in FIG. 3, the at least two first regions 116 of reduced diameter form a waist or recessed channels about at least two parts of the circumference of the sleeve 100. The recessed channels are aligned with parts of the unthreaded portion 108 of the sucker rod or tool 101 for engagement therewith when the thread protector 100 is in place on the sucker rod or tool 101.

The sleeve 110 comprises at least two second regions 118 separated around a circumference of the sleeve 110. The at least two second regions 118 are of enlarged diameter compared with the at least two first regions 116. The at least two second regions 118 each comprise a raised portion 119, which is substantially square in the embodiment shown in FIGS. 2 to 6, but is not restricted to this shape. The raised portions 119 comprise a shallow depression 121 therein, as shown particularly in FIGS. 2, 3 and 5, for receiving, for example, a thumb and forefinger, to facilitate the application of pressure to the at least two second regions 118 of enlarged diameter.

When the thread protector 100 is in place on the end of the sucker rod 101, the application of pressure to the at least two second regions 118 of the sleeve 110 causes disengagement of the at least two first regions 116 from regions of the unthreaded portion or stress relief portion 108 of the sucker rod or tool 101.

In the embodiment shown in FIGS. 2 to 6, the sleeve 110 comprises at least one protrusion 120 extending from an internal wall 122 of the sleeve 110 around at least part of the circumference of the sleeve. The at least one protrusion 120 is in the form of a thread for engagement with at last one thread 124 of the at least one externally threaded portion 104 of the end of the sucker rod or tool 101. In such embodiments, the thread protector 100 is pushed onto the end of the sucker rod or tool 101 until the at least two first regions 116 of reduced diameter engage with regions of the unthreaded portion or stress relief portion 108 of the end or pin 102. At this point the thread protector 100 cannot vibrate off the sucker rod or tool 101. The thread protector 100 is then rotated clockwise for an even more secure fit. Where the at least one protrusion 120 is in the form of a thread spanning one circumference of the sleeve 110, one revolution of the thread protector 100 is sufficient. In such embodiments, the thread protector 100 must also be rotated anticlockwise, in addition to applying pressure to the at least two second regions 118 of enlarged diameter, to enable removal of the thread protector 100 from the end of the sucker rod or tool 101.

According to some embodiments, however, the at least one protrusion 120 extending from the internal wall 122 of the sleeve 110 can be omitted. In such embodiments, the thread protector 100 is pushed onto the end of the sucker rod or tool 101 until the at least two first regions 116 of reduced diameter engage with regions of the unthreaded portion or stress relief portion 108 of the end or pin 102 and no rotation is required. In such embodiments, applying pressure to the at least two second regions 118 of enlarged diameter, and specifically to the shallow depression 121 in the raised portions 119, allows the thread protector 100 to be pulled off the end of the sucker rod or tool 101 without the need to also rotate the thread protector 100.

Figure 13:
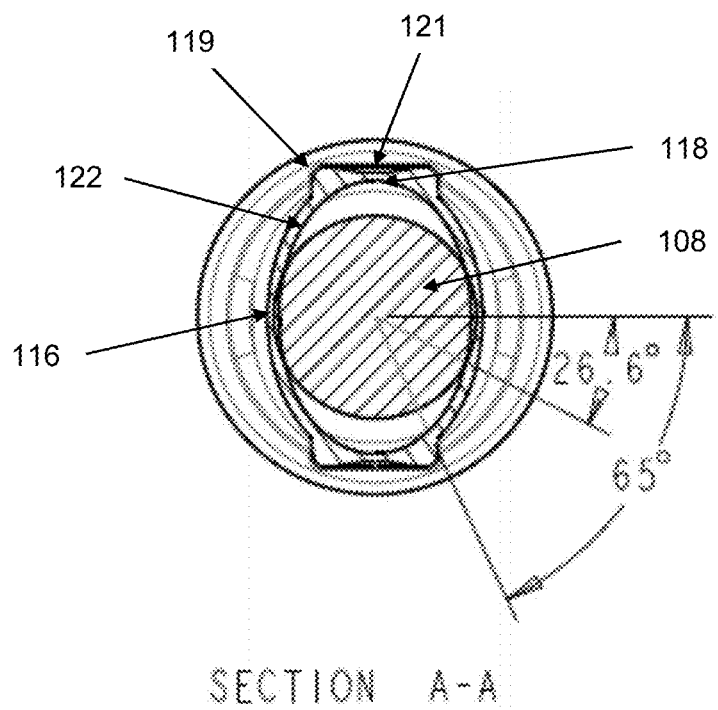
FIG. 13 is a cross-sectional view of the thread protector shown in FIG. 11 along A-A.

In the embodiment shown in FIGS. 2 to 6, it can be seen that the at least two first regions 116 of reduced diameter of the sleeve 110 are on opposite sides of the sleeve, i.e. diametrically opposite each other. However, it should be appreciated that the present invention is not limited to the at least two first regions 116 of reduced diameter being diametrically opposite each other and other angular separations of the at least two first regions 116 of reduced diameter about the sleeve 110 are envisaged. In the embodiment shown in FIGS. 2 to 6, each of the at least two first regions 116 of reduced diameter extend approximately 130 degrees about the sleeve 110, as shown in FIG. 13. However, the at least two first regions 116 of reduced diameter can extend a different circumference about the sleeve 110.

In the embodiment shown in FIGS. 2 to 6, the at least two second regions 118 of enlarged diameter of the sleeve 110 are on opposite sides of the sleeve, i.e. diametrically opposite each other. This arrangement facilitates the application of pressure to the at least two second regions 118 of enlarged diameter, and specifically to the shallow depressions 121 in the raised portions 119, for example, with the thumb and forefinger. However, it should be appreciated that the present invention is not limited to the at least two second regions 118 of enlarged diameter being diametrically opposite each other and other angular separations of the at least two second regions 118 of reduced diameter about the sleeve 110 are envisaged.

In the embodiment shown in FIGS. 2 to 6, and with particular reference to FIG. 13, a central point of at least one of the at least two first regions 116 of reduced diameter of the sleeve is 90 degrees apart from a central point of at least one of the at least two second regions 118 of enlarged diameter.

Figure 11:
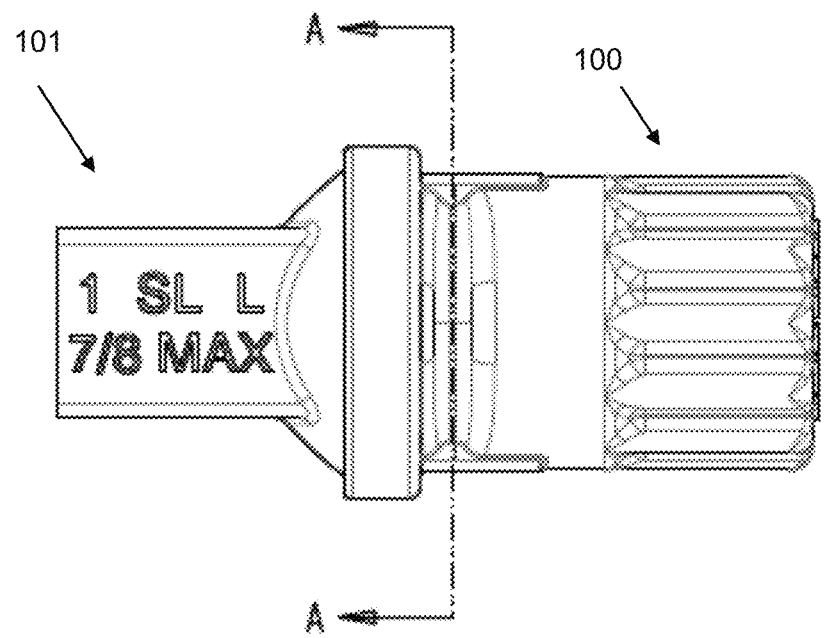
FIG. 11 is a side view of an embodiment of the thread protector attached to a sucker rod.
Figure 12:
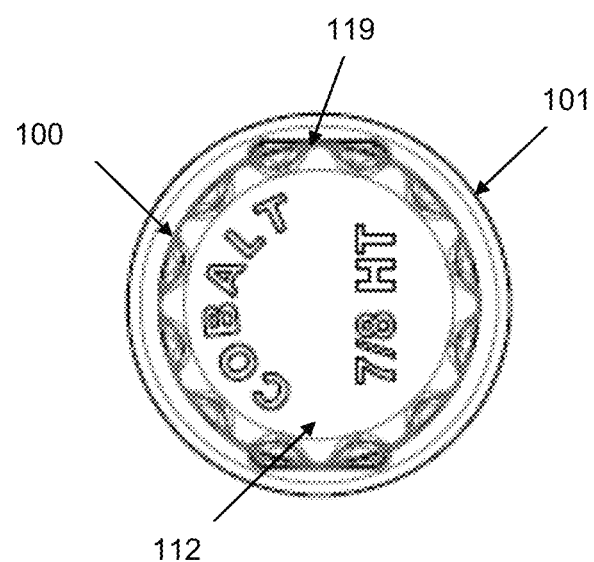
FIG. 12 is an end view of the thread protector shown in FIG. 11.

With particular reference to FIGS. 11 to 13, part of the internal wall 122 of the sleeve 110 is substantially elliptical in cross section. The substantially elliptical shape of the internal wall 122 comprises the at least two separated first regions 116 of reduced diameter and the at least two separated second regions 118 of enlarged diameter. FIG. 13 in particular highlights that the separated first regions 116 of reduced diameter of the thread protector 100 do not grip or engage the full circumference of the unthreaded portion 108, or stress relief, but only part of the circumference thereof. In some embodiments, each separated first region 116 of reduced diameter of the sleeve 110 grips or engages about 65 degrees of the circumference of the unthreaded portion 108, or stress relief. However, the present invention is not limited to this angle of the circumference, and other angles are envisaged; for example, to grip or engage sucker rods or tools of different diameters.

In the embodiment shown in FIGS. 2 to 6, and with particular reference to FIGS. 5 and 6, at least part of the internal wall 122 of the sleeve 110 between the closed end 112 and the first regions 116 of reduced diameter, around at least part of the circumference of the sleeve, is adjacent, and tightly fitting against, at least part of the externally threaded portion 104 of the end 102 of the sucker rod or tool 101.

In such embodiments, at least part 125 of the internal wall 122 of the sleeve 110 between the closed end 112 and the first regions 116 of reduced diameter, around at least part of the circumference of the sleeve, is spaced apart from at least part of the externally threaded portion 104 of the end 102 of the sucker rod or tool 101.

In the embodiments shown, between the closed end 112 and the first regions 116 of reduced diameter, about two thirds of the length of the internal wall 122 of the sleeve 110 is adjacent, and tightly fitting against, the externally threaded portion 104.

In the embodiment shown in FIGS. 2 to 6, and with particular reference to FIGS. 5 and 6, at least part of the internal wall 122 of the sleeve 110 around at least part of the circumference of the sleeve is spaced apart from at least part of the unthreaded portion 108 of the end 102 of the sucker rod or tool 101.

In the embodiment shown in FIGS. 2 to 6, and with particular reference to FIGS. 5 and 6, the open end 114 of the sleeve 110 comprises a region 126 of enlarged diameter about the circumference to accommodate, and for engagement with the flange 106 of the sucker rod or tool 101.

In some embodiments, the region 126 of enlarged diameter of the open end 114 of the sleeve 110 comprises at least one protrusion 128 extending from the internal wall 122 of the sleeve around at least part of the circumference of the sleeve, and preferably around the whole circumference of the sleeve. The at least one protrusion 128 is for engagement with the flange 106 and to provide a tight seal thereagainst.

In some embodiments, an external wall 130 of the sleeve 110 comprises one or more spaced apart ribs or protrusions 132 to facilitate grip of the thread protector 100 by a user. In preferred embodiments, a series of spaced apart ribs or protrusions 132 are provided about the circumference of the external wall 130 of the sleeve 110 from the closed end 112 to the part 125 of the internal wall 122 of the sleeve 110 that is spaced apart from the externally threaded portion 104.

Preferred embodiments of the thread protector 100 have a unitary structure, i.e. the thread protector 100 is a one-piece component.

Preferred embodiments of the thread protector 100 are moulded from any suitable plastics material. In particular, preferred embodiments of the thread protector 100 are injection moulded from a thermoplastic polymer, such as, but not limited to urethane, high density polyethylene (HDPE) or an alloyed polymer, which are sufficiently robust for harsh environments such that they will not crack like nylon, whilst providing the required flexibility, in particular for the first and second regions 116, 118.

In some embodiments, the thread protector 100 is colour-coded. The colour coding can indicate a particular supplier or can be according to a category or classification of use of the thread protector 100, such as, but not limited to an American Petroleum Industry (API) category, or equivalents in other countries. Colour-coding can facilitate, for example, quick visual grouping of the thread protectors and the sucker rod, pipe or tool to which they are attached by classification, grade, such as metallurgy grade etc.

In some embodiments, the thread protector 100 can include the name and/or logo of the supplier of the thread protector 100 and/or other indicia, such as a sizing of the thread protector 100 and/or other alphanumeric data. Such indicia can be provided, for example, on the external wall 130 of the thread protector 100, for example on the closed end 112, as shown most clearly in FIGS. 2, 4 and 12. Such indicia can be formed during the moulding process, for example. The moulding tool will have interchangeable inserts to allow private labelling of the thread protector 100 and/or the inclusion of the desired indicia.

Figure 9:
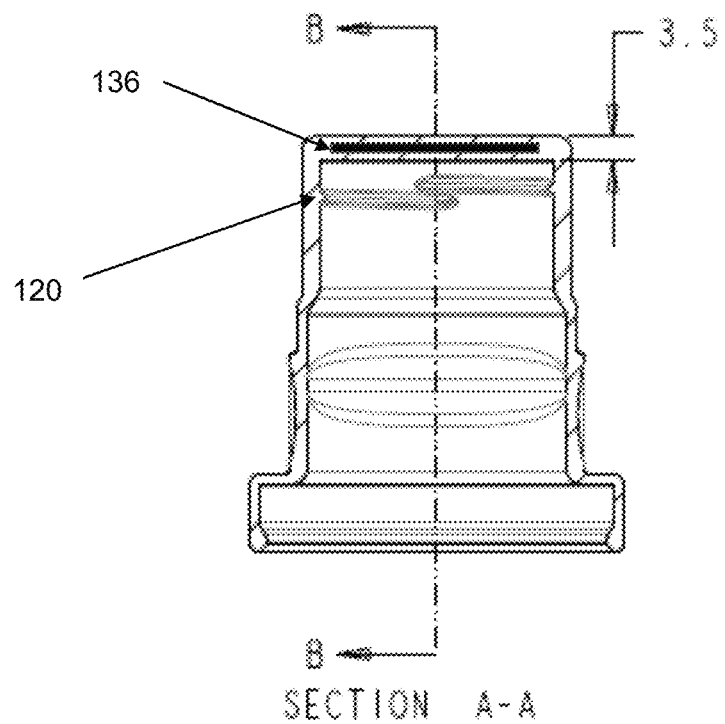
FIG. 9 is a cross-sectional view of the thread protector shown in FIG. 8 along A-A.
Figure 10:
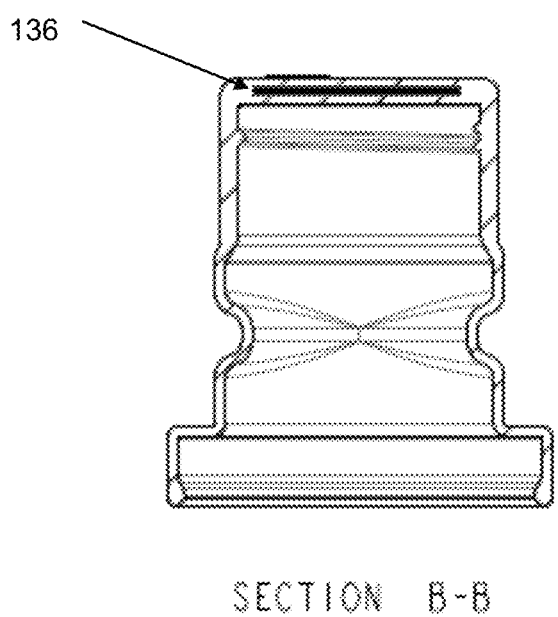
FIG. 10 is a cross-sectional view of the thread protector shown in FIG. 9 along B-B.

In some embodiments, the thread protector 100 comprises an identification device 136, such as a RFID chip, a QR code, or a barcode, for example, mounted to, affixed to, printed on or embedded in the closed end 112 of the sleeve 110. FIGS. 9 and 10 show an example of an identification device 136 in the form of an RFID chip embedded, or inlaid in the closed end 112 of the sleeve 110. The RFID chip is thus protected and the performance and operation of the thread protector 100 is not affected. The RFID chip can be an UHF RFID chip and can be about 18 mm in diameter, but other RFID chips and identification devices can be used.

It will be appreciated that an identification device 136, such as a QR code, or a barcode, which must be visible, for scanning purposes, would need to be mounted to, or otherwise provided on the external wall 130 of the thread protector 100.

According to some embodiments of the present invention, thread protectors comprising the identification device 136 can be of a specific colour and/or have specific indicia to clearly indicate to users that the thread protector comprises the identification device 136. Such indicia avoid users wasting time scanning or otherwise attempting to read thread protectors without an identification device 136.

The identification device 136 enables, for example, one or more of the following characteristics of the sucker rod, pipe or tool to which the thread protector 100 is attached to be determined: a location; a wear or use status, such as whether the sucker rod, pipe or tool is new, used or refurbished.

The identification device 136 enables an asset tracking system for sucker rods, pipes and tools, etc. to be implemented, thus providing end-users with efficient tracking, auditing and stock control of individual sucker rods, pipes and tools, etc. and groups thereof and providing end-users with a better understanding of their assets. For example, the identification device 136 in or on the thread protector 100 can be scanned and relevant data will be logged directly to a smart phone, computer or other mobile device and/or uploaded to the cloud. This allows for dynamic workflows and improved processes, thus increasing operational efficiencies and reducing non-productive time (NPT) in critical operations.

Another aspect of the present invention resides in a sucker rod or tool 101 comprising an end 102 having at least one externally threaded portion 104, the flange 106 and the unthreaded portion 108 between the at least one externally threaded portion 104 and the flange 106, and a thread protector as described herein engaged with the end of the sucker rod or tool 101. Sucker rods, tools and the like are often sold and shipped with the thread protector attached to provide the desired protection and identified described herein.

Figure 14:
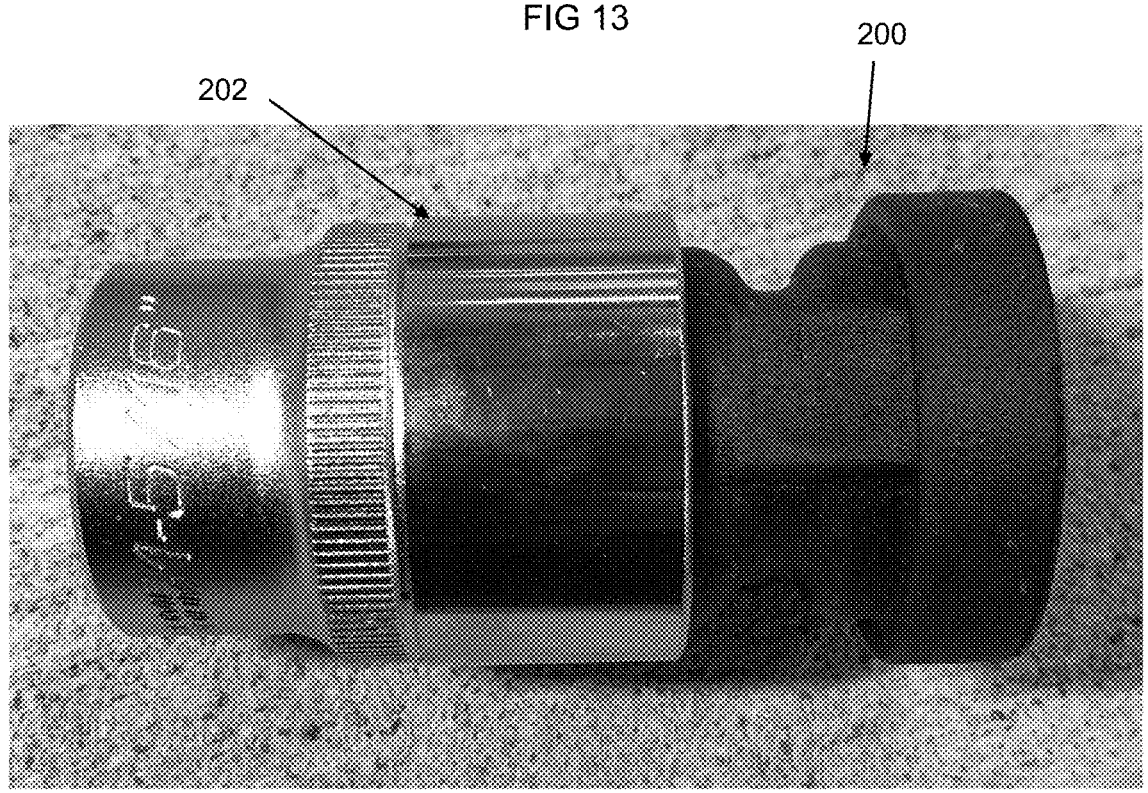
FIG. 14 is an image of a thread protector in accordance with embodiments of the present invention attached to an end of a typical sucker rod connector comprising an internal thread.
Figure 15:
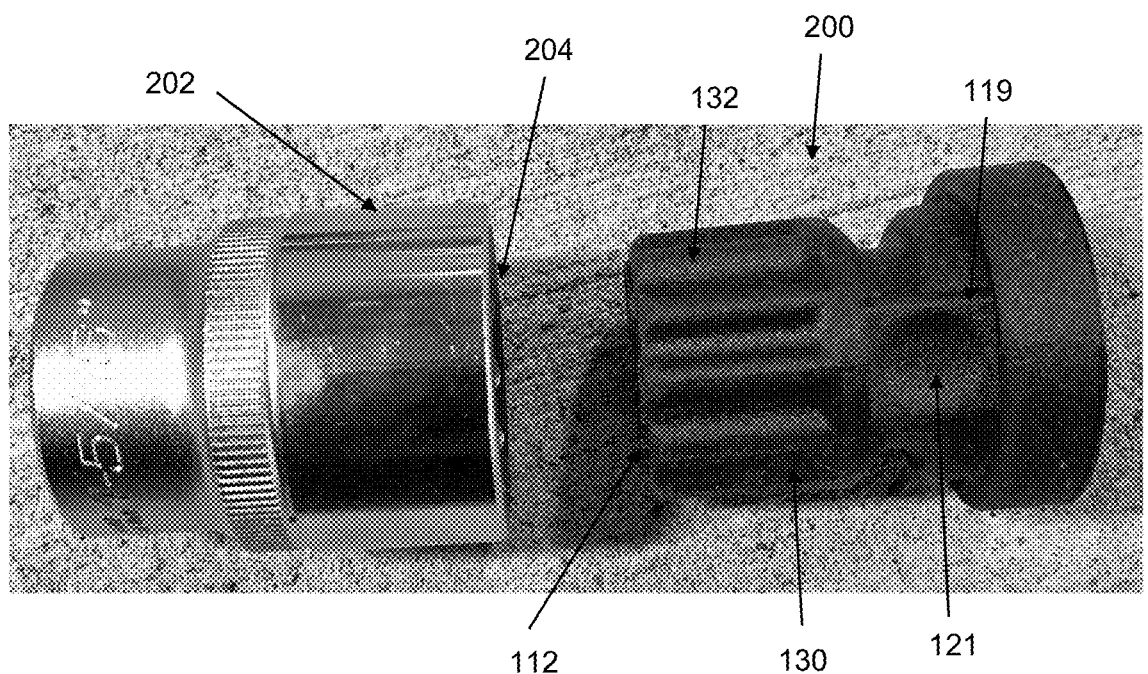
FIG. 15 is an image of the thread protector shown in FIG. 14 separated from the sucker rod connector.
Figures 16, 17:
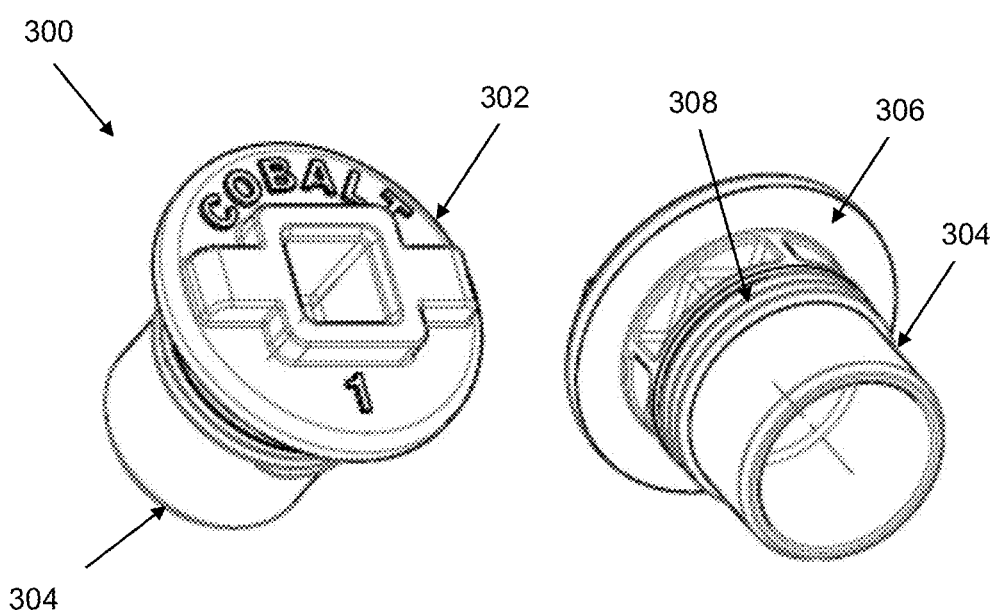
FIG. 16 is a top perspective view of a thread protector for an internal thread in accordance with other embodiments of the present invention.
FIG. 17 is a bottom perspective view of the thread protector shown in FIG. 14.
Figure 18:
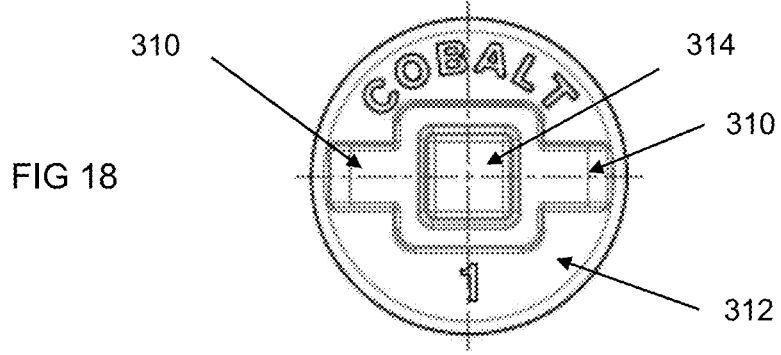
FIG. 18 is a plan view of the thread protector shown in FIG. 14.
Figure 19:
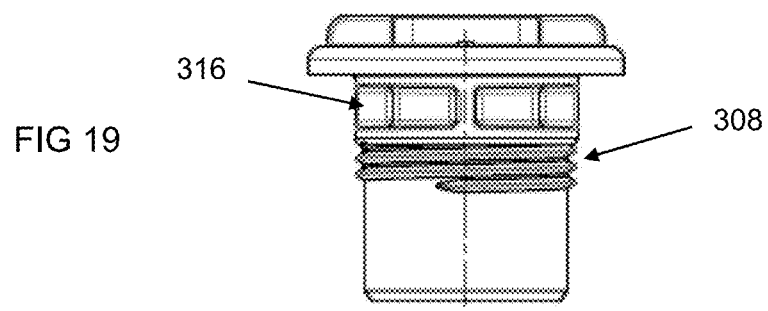
FIG. 19 is a side view of the thread protector shown in FIG. 14.
Figure 20:
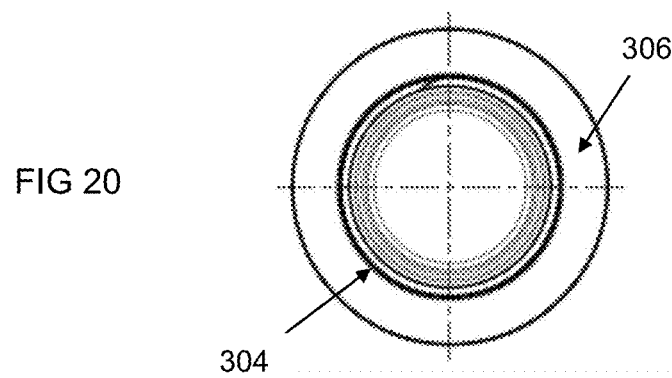
FIG. 20 is a bottom view of the thread protector shown in FIG. 14.
Figure 21:
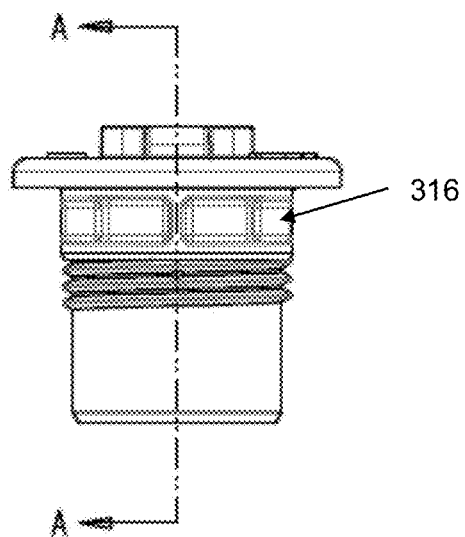
FIG. 21 is another side view of the thread protector shown in FIG. 14.
Figure 22:
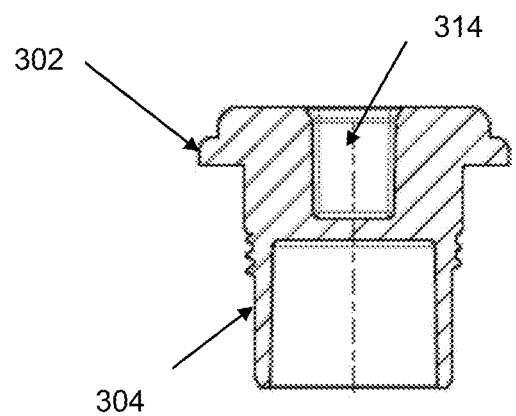
FIG. 22 is a cross-sectional view of the thread protector shown in FIG. 14 along A-A.

With reference to FIGS. 14 and 15, thread protectors in accordance with embodiments of the present invention can be attached to an end of a typical sucker rod connector 202, or other article, comprising an internal thread 204. FIGS. 14 and 15 respectively show a 3D-printed prototype of the thread protector 200 connected to, and separated from the sucker rod connector 202. Thread protector 200 comprises many of the same features as thread protector 100 described herein. Thread protector 200 comprises the series of spaced apart ribs or protrusions 132 about the circumference of the external wall 130 of the sleeve 110 from the closed end 112 toward the raised portions 119 comprise the shallow depression 121 therein. The spaced apart ribs or protrusions 132 are sized, shaped and spaced for engagement with the internal thread 204 of the connector 202 with which the thread protector 200 is to be used.

According to other embodiments of the thread protector in accordance with the present invention, it is envisaged that the thread protector 100 can comprise a single region 116 of reduced diameter and a single region 118 of enlarged diameter. In such embodiments, the thread protector comprises the sleeve 110 having the closed end 112 and the open end 114 opposite the closed end as described herein. The open end 114 is for receiving and engaging with the end of the sucker rod or tool by pushing the thread protector onto the end 102 of the sucker rod or tool 101. However, in such other embodiments, it is envisaged that the sleeve 110 comprises one or more first regions 116 having reduced diameter around a circumference of the sleeve for engagement with one or more regions 108 of the end of the sucker rod or tool. The sleeve 110 comprises one or more second regions 118 having enlarged diameter around the circumference of the sleeve. The application of pressure to the one or more second regions 118 of the sleeve causes disengagement of the one or more first regions 116 from the end of the sucker rod or tool to enable removal of the thread protector from the one or more regions 108 of the end of the sucker rod or tool 101. Hence, it is envisaged that some embodiments of the thread protector 100 can comprise a single region 116 of reduced diameter and a single region 118 of enlarged diameter. For example, the single region 116 of reduced diameter can be provided on one side of the sleeve 110 and the single region 118 of enlarged diameter can be provided on the opposite side of the sleeve 110. In such embodiments, a user may apply pressure to the single region 118 of enlarged diameter with a thumb and place their forefinger on the region 126 of enlarged diameter about the flange 106 of the sucker rod or tool 101 to disengage the single region 116 of reduced diameter.

In such embodiments, the sleeve 110 can comprise at least one protrusion 120, extending from the internal wall 122 of the sleeve around at least part of the circumference of the sleeve 110, for engagement with at last one thread 124 of the at least one externally threaded portion 104 of the end of the sucker rod or tool 101 such that the thread protector 100 must also be rotated to maximize security of the thread protector 100 in place and to enable removal of the thread protector from the end of the sucker rod or tool.

Further embodiments of the thread protector will now be described with reference to FIGS. 16-22. Thread protector 300 is designed to protect an internal thread or "female" thread in an open end of a sucker rod coupling, connector or the like. The thread protector 300 comprises a cap 302 to cover the open end of the sucker rod coupling, connector or the like. The thread protector 300 comprises a body 304 extending from an underside 306 of the cap 302. The body 304 is generally cylindrical and in preferred embodiments, the body 304 is substantially hollow which reduces the amount of material used to manufacture the thread protector 300 and thus the mass. The body 304 comprises an external thread 308 for engagement with the at least one internally threaded portion of the sucker rod coupling, connector or the like. The thread protector 300 comprises at least one lug 310 protruding from a top surface 312 of the cap 302 to facilitate insertion of the thread protector 300 into the open end and removal of the thread 300 protector from the open end of the sucker rod coupling, connector or the like. In the embodiments shown in FIGS. 16-22, the thread protector 300 comprises a pair of lugs 310 protruding from the top surface 312 of the cap 302 and extending almost to the perimeter of the cap 302 to facilitate insertion and removal of the thread protector 300 using thumb and forefinger.

According to some embodiments, as shown in FIGS. 16-22, the thread protector 300 comprises an aperture 314 extending into the cap 302, and optionally into the body 304, as shown, to facilitate tightening and loosening of the thread protector 300 using a standard tool, such as a standard ½" socket drive.

According to some embodiments, as shown in FIGS. 16-22, the thread protector 300 comprises one or more recesses 316 in the body 304 in between the underside 306 of the cap 302 and the external thread 308. The recesses 316 further reduce the amount of material used to manufacture the thread protector 300 and thus the mass.

As described in relation to other embodiments of the present invention herein, the thread protector 300 can comprise at least one identification device 136 and/or indicia, for example, on the cap 302 as shown, to indicate a supplier of the thread protector and/or a grade, characteristic etc. of the sucker rod coupling, connector or the like to which the thread protector 300 is connected. Optionally, the thread protector 300 can be colour-coded as described herein.

It will be appreciated that the thread protector according to embodiments of the present invention is highly customizable to different sizes of sucker rod, tool, etc. and thread sizes thereof. The thickness of the sleeve 110 of the thread protector 100 can also be adjusted to suit the different sizes.

Hence, embodiments of the present invention address or at least ameliorate at least some of the aforementioned problems of the prior art by providing a lightweight, reusable, one-piece thread protector that is easily, efficiently and securely attached to sucker rods, tools, connectors etc. and easily and efficiently removed therefrom. A specialist tool is not required to attach or remove the thread protector because the thread protector can be attached and removed by hand. Nonetheless, the thread protector is securely attached and cannot be removed by vibration, for example, during transit. The thread protector of the present invention is a simpler construction that at least some of the prior art thread protectors and does not have multiple or ancillary parts that can be lost or misplaced. The thread protector can be easily mass-produced using, for example, injection moulding, does not rust, and provides genuine protection of the thread against dust, moisture and impacts. The option of colour coding provides instant identification of the type of sucker rod, tool, connector etc. and/or its grade, level of use etc. The option of the thread protector comprising an identification device facilitates tracking, auditing and management of inventory.

In this specification, adjectives such as first and second, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A thread protector for use on a sucker rod or tool, the sucker rod or tool comprising an end having at least one externally threaded portion, a flange and an unthreaded portion between the at least one externally threaded portion and the flange, the thread protector comprising:
   a sleeve having a closed end and an open end opposite the closed end, the open end for receiving the end of the sucker rod or tool;
   the sleeve having at least two first regions separated around a circumference of the sleeve, the at least two first regions of reduced diameter for engagement with regions of the unthreaded portion of the sucker rod or tool; and
   the sleeve having at least two second regions separated around a circumference of the sleeve, the at least two second regions of enlarged diameter;
   whereupon application of pressure to the at least two second regions of the sleeve causes disengagement of the at least two first regions from regions of the unthreaded portion of the sucker rod or tool to enable removal of the thread protector from the end of sucker rod or tool.

2. The thread protector of claim 1, wherein the sleeve comprises at least one protrusion extending from an internal wall of the sleeve around at least part of the circumference of the sleeve, the at least one protrusion for engagement with at last one thread of the at least one externally threaded portion of the end of the sucker rod or tool, such that the thread protector must also be rotated to enable removal of the thread protector from the end of the sucker rod or tool.

3. The thread protector of claim 1, wherein the at least two first regions of reduced diameter of the sleeve are on opposite sides of the sleeve, i.e. diametrically opposite each other.

4. The thread protector of claim 1, wherein the at least two second regions of enlarged diameter of the sleeve are on opposite sides of the sleeve, i.e. diametrically opposite each other.

5. The thread protector of claim 1, wherein at least one of the at least two first regions of reduced diameter of the sleeve is 90 degrees apart from at least one of the at least two second regions of enlarged diameter of the sleeve.

6. The thread protector of claim 2, wherein the internal wall of the sleeve is substantially elliptical in cross section, the substantially elliptical shape comprising the at least two separated first regions of reduced diameter and the at least two separated second regions of enlarged diameter.

7. The thread protector of claim 2, wherein at least part of the internal wall of the sleeve around at least part of the circumference of the sleeve is adjacent at least part of the externally threaded portion of the end of the sucker rod or tool.

8. The thread protector of claim 2, wherein at least part of the internal wall of the sleeve around at least part of the circumference of the sleeve is spaced apart from at least part of the externally threaded portion of the end of the sucker rod or tool.

9. The thread protector of claim 2, wherein at least part of the internal wall of the sleeve around at least part of the circumference of the sleeve is spaced apart from at least part of the unthreaded portion of the end of the sucker rod or tool.

10. The thread protector of claim 2, wherein the open end of the sleeve comprises a region of enlarged diameter about the circumference for engagement with the flange of the sucker rod or tool.

11. The thread protector of claim 10, wherein the region of enlarged diameter of the open end of the sleeve comprises at least one protrusion extending from the internal wall of the sleeve around at least part of the circumference of the sleeve, the at least one protrusion for engagement with the flange.

12. The thread protector of claim 1, wherein an external wall of the sleeve comprises one or more spaced apart ribs or protrusions to facilitate grip of the thread protector.

13. The thread protector of claim 1, wherein the thread protector has a unitary structure, i.e. is a one-piece component.

14. The thread protector of claim 1, wherein the thread protector is moulded from any suitable plastics material, in particular, injection moulded from urethane.

15. The thread protector of claim 1, wherein the thread protector is colour-coded according to a category or classification of use, such as, but not limited to an American Petroleum Industry (API) category, or equivalents in other countries.

16. The thread protector of claim 1, further comprising an identification device, such as a RFID chip, a QR code, or a barcode.

17. The thread protector of claim 16, wherein the identification device is mounted to, affixed to, printed on or embedded in the closed end of the sleeve.

18. The thread protector of claim 16, wherein the identification device enables one or more of the following characteristics of the sucker rod, pipe or tool to which the thread protector is attached to be determined: a location; a wear status or use status, such as new, used or refurbished.

19. The thread protector of claim 16, wherein the thread protector is of a specific colour and/or comprises specific indicia to indicate that the thread protector comprises the identification device.

20. A thread protector for use on a sucker rod or tool, the sucker rod or tool comprising an end having at least one externally threaded portion, a flange and an unthreaded portion between the at least one externally threaded portion and the flange, the thread protector comprising:
   a sleeve having a closed end and an open end opposite the closed end, the open end for receiving and engaging with the end of the sucker rod or tool by pushing the thread protector onto the end of the sucker rod or tool;
   the sleeve having one or more first regions around a circumference of the sleeve having reduced diameter for engagement with one or more regions of the end of the sucker rod or tool;
   the sleeve having one or more second regions around the circumference of the sleeve having enlarged diameter;
   whereupon application of pressure to the one or more second regions of the sleeve causes disengagement of the one or more first regions from the end of the sucker rod or tool to enable removal of the thread protector from the end of the sucker rod or tool.

21. The thread protector of claim 20, wherein the sleeve comprises at least one protrusion, extending from an internal wall of the sleeve around at least part of the circumference of the sleeve, for engagement with at last one thread of the at least one externally threaded portion of the end of the sucker rod or tool such that the thread protector must also be rotated to enable removal of the thread protector from the end of the sucker rod or tool.

22. A sucker rod or tool comprising an end having at least one externally threaded portion, a flange and an unthreaded portion between the at least one externally threaded portion and the flange, and the thread protector as claimed in claim 1 engaged with the end of the sucker rod or tool.

23. A thread protector for use on a sucker rod or tool, such as, but not limited to a connector, the sucker rod or tool comprising an open end permitting access to at least one internally threaded portion, the thread protector comprising:
   a cap to cover the open end;
   a body extending from an underside of the cap, the body having an external thread for engagement with the at least one internally threaded portion; and
   at least one lug protruding from a top surface of the cap to facilitate insertion of the thread protector into the open end and removal of the thread protector from the open end.

24. The thread protector of claim 23, comprising an aperture extending into the cap, and optionally into the body, to facilitate tightening and loosening of the thread protector using a standard tool.

25. A sucker rod or tool comprising an open end permitting access to at least one internally threaded portion and the thread protector as claimed in claim 23 engaged with the open end of the sucker rod or tool.

\* \* \* \* \*